(12) United States Patent
Li et al.

(10) Patent No.: US 8,559,337 B2
(45) Date of Patent: Oct. 15, 2013

(54) SYSTEM AND APPARATUS FOR CONVERGING WIMAX AND WIFI NETWORKS

(75) Inventors: Hong Li, Kista (SE); Yingchun Xie, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/273,332

(22) Filed: Oct. 14, 2011

(65) Prior Publication Data

US 2012/0033639 A1 Feb. 9, 2012

Related U.S. Application Data

(63) Continuation of application No. PCT/CN2009/071270, filed on Apr. 15, 2009.

(51) Int. Cl.
*H04L 12/28* (2006.01)
*H04L 12/66* (2006.01)
*H04W 4/00* (2009.01)

(52) U.S. Cl.
USPC ........... 370/254; 370/328; 370/331; 370/332; 370/356

(58) Field of Classification Search
None
See application file for complete search history.

(56) References Cited

U.S. PATENT DOCUMENTS

| | | | | |
|---|---|---|---|---|
| 7,920,523 | B2 * | 4/2011 | Grinshpun et al. | 370/331 |
| 2003/0236982 | A1 * | 12/2003 | Hsu | 713/171 |
| 2009/0052396 | A1 * | 2/2009 | Bucker et al. | 370/331 |
| 2009/0168754 | A1 * | 7/2009 | Shan | 370/352 |
| 2010/0046477 | A1 * | 2/2010 | Marin et al. | 370/332 |
| 2011/0063997 | A1 * | 3/2011 | Gras et al. | 370/254 |

FOREIGN PATENT DOCUMENTS

| | | |
|---|---|---|
| CN | 1909739 A | 2/2007 |
| CN | 1992637 A | 7/2007 |
| CN | 1010187178 A | 8/2007 |
| CN | 101119594 A | 2/2008 |
| WO | 2006/087616 A1 | 8/2006 |

OTHER PUBLICATIONS

Hung-Min Sun et al. "Secure and Efficient Handover Schemes for Heterogeneous Networks", IEEE Asia-Pacific Services Computing Conference, 2008, pp. 205-210.
Ed. Vivek Gupta, "WiFi and WiMAX Interworking",Version 0.03, WiMAX Forum Networking Group, 2009.
Shao Zhen et al. "Analysis of the Key Problems on Convergence of Mobile WiMax and Wi-Fi", Shanghai Research Institute of China Telecom, 2008, Abstract.
Da Zhong Ke Ji "WiMAX, Wi-Fi, 3G", No. 1, 2009, pp. 65-67.

(Continued)

*Primary Examiner* — Melanie Jagannathan
(74) *Attorney, Agent, or Firm* — Staas & Halsey LLP

(57) ABSTRACT

A system for converging Worldwide Interoperability for Microwave Access (WiMAX) and Wireless Fidelity (WiFi) networks is provided. The system includes an interworking adaptor (IWA) or interworking control function (IWCF). The IWA or IWCF is configured to communicate with an access point (AP)/access controller (AC) of the WiFi network, and also configured to communicate with an entity in a connectivity service network (CSN) of the WiMAX network, where the IWA or IWCF is further configured to perform access control on a terminal STA/MS accessing the CSN from the WiFi network. By using the system for converging the WiMAX and WiFi networks disclosed in the foregoing embodiments of the present invention, convergence of one or more functions between the WiFi and WiMAX networks may be implemented conveniently.

25 Claims, 8 Drawing Sheets

(56) References Cited

OTHER PUBLICATIONS

Written Opinion of the International Searching Authority issued Jan. 28, 2010 in corresponding International Patent Application No. PCT/CN2009/071270 (4 pages) (4 pages English Translation).

Da Zhong Ke Ji, "WiMax, WiFi, 3G," No. 1, 2009, p. 65-67 (4 pages) (Partial Translation of Research based on WiMAX, Wi-Fi, and 3G Network Convergence Technology, No. 1, 2009. College of Information and Communication Engineering, Guilin University of Electronic Technology, Guilin, Guangxi 541004 (1 page English Abstract), Partial (Abstract).

International Search Report, mailed Jan. 28, 2010, in International Application No. PCT/CN2009/071270 (4 pp.).

* cited by examiner

SYSTEM AND APPARATUS FOR CONVERGING WIMAX AND WIFI NETWORKS

CROSS-REFERENCE TO RELATED APPLICATIONS

This application is a continuation of International Application No. PCT/CN2009/071270, filed on Apr. 15, 2009, which is hereby incorporated by reference in its entirety.

FIELD OF THE INVENTION

The present invention relates to the field of communication technologies, and particularly to a system and an apparatus for converging Worldwide Interoperability for Microwave Access (WiMAX) and Wireless Fidelity (WiFi) networks.

BACKGROUND OF THE INVENTION

A WiMAX technology is an air interface standard proposed on the basis of the IEEE 802.16 series broadband wireless standards. A current WiMAX network wireless side is mainly based on the IEEE 802.16d/e standard; the IEEE 802.16d standard defines a medium access control (MAC) layer of a fixed broadband wireless access system that supports various service types and a plurality of corresponding physical layer frameworks; and the IEEE 802.16e standard adds some new functions on the basis of the IEEE 802.16d standard, so as to support user mobility.

FIG. 1 is a reference model of a WiMAX network architecture, mainly including three parts: a client (a mobile station/subscriber station (referred to as MS/SS), that is, a mobile terminal/registration terminal), an access service network (referred to as ASN), and a connectivity service network (referred to as CSN).

The ASN may include a base station (referred to as BS) and an access service network gateway (referred to as ASN GW). The CSN may include logical entities such as a prepaid service (PPS) server and an authentication, authorization, and accounting (AAA) server.

In an existing protocol, logical entities between the MS/SS, ASN, and CSN conduct communication through R1 to R6 interfaces. Referring to FIG. 1, the R1 interface is a wireless air interface and is mainly defined by IEEE 802.16d/e, an R2 is a logical interface, and an R3, R4, and R5 interfaces are all wired interfaces.

A WiFi system is a wireless broadband network access technology defined by an 802.11 protocol published by the Institute of Electrical and Electronics Engineers (IEEE), and its feature lies in requiring no wiring. A station (STA) may establish a connection with an access point (AP) through an air interface defined by the 802.11 protocol. Because the 802.11 series protocols only focus on the definition of the air interface protocol between the STA and the AP, the AP must be converged with another network, and the another network provides network-side services for the STA, so as to implement wireless network access of the STA. With the development of the deployment of the WiFi network, in order to manage centralized APs, some manufacturers also design an access controller (AC) or a module having a similar function, to implement management on the APs and enable the APs to connect to the network side through the AC.

The development of the communication technologies makes convergence between communication systems become a trend. As two typical technologies of wireless access, convergence of WiFi and WiMAX systems is also a tendency. Because WiFi does not have its own network-side technical specification, sharing of a core network CSN with WiMAX becomes the main content of its network convergence.

The inventor finds that, currently, the technology of convergence of WiFi and WiMAX systems is mainly a solution of adding an adaptation layer in a protocol stack of two heterogeneous networks, where the solution is defined in the 802.21 protocol. However, implementation of this solution requires greater change to an existing network device, and the solution cannot be implemented through smooth upgrade of the existing device.

SUMMARY OF THE INVENTION

Embodiments of the present invention discloses a system and an apparatus for converging WiMAX and WiFi networks, so as to implement access control on a terminal accessing the WiMAX network from the WiFi network.

According to one aspect, the present invention discloses a system for converging WiMAX and WiFi networks through some embodiments, where the system includes an interworking adaptor (IWA) or interworking control function (IWCF). The IWA or IWCF is configured to communicate with an AP/AC of the WiFi network, and also configured to communicate with an entity in a CSN of the WiMAX network, where the IWA or IWCF is further configured to perform access control on a terminal STA/MS accessing the CSN from the WiFi network.

According to another aspect, the present invention discloses a system for converging WiMAX and WiFi networks through some embodiments, where the system includes an IWA. The IWA is capable of communicating with an AP/AC of the WiFi network, and also capable of communicating with an ASN GW of the WiMAX network, where the IWA is configured to perform access control on a terminal STA/MS accessing the ASN GW from the WiFi network.

According to a third aspect, the present invention discloses a network convergence apparatus through some embodiments, where the apparatus includes:

a first transceiver module, configured to receive an access authentication message from an AP/AC of a WiFi network, where the access authentication message carries identity information of a terminal STA/MS; and a second transceiver module, configured to forward the access authentication message received by the first transceiver module and the identity information of the STA/MS carried in the access authentication message to an AAA server of a WiMAX network, and receive an access authentication response message from the AAA server, where the first transceiver module is further configured to forward the access authentication response message received by the second transceiver module to the AP/AC.

According to a fourth aspect, the present invention discloses a network convergence apparatus through some embodiments, where the apparatus includes:

a first transceiver module, configured to receive a mobile Internet Protocol (MIP) registration request from an IWCF;

a second transceiver module, configured to communicate with a home agent (HA) in a WiMAX network; and a MIP registration module, configured to forward the MIP registration request to the HA through the second transceiver module according to the MIP registration request received by the first transceiver module, where the second transceiver module is further configured to receive a MIP registration response from the HA; and the MIP registration module is further configured to establish, according to the MIP registration response received by the second transceiver module, a MIP tunnel between the MIP registration module and the HA when the MIP registration is successful.

By using the system and the apparatus disclosed in the embodiments of the present invention, convergence of one or more functions between the WiFi and WiMAX networks may be implemented conveniently.

DETAILED DESCRIPTION OF THE EMBODIMENTS

In order to make the objectives, technical solutions, and advantages of the present invention more comprehensible, embodiments of the present invention are further described in detail below with reference to the accompanying drawings.

As described above, because WiFi does not define its own network-side protocol, the main content of convergence between WiFi and WiMAX networks is sharing of a CSN. To implement network convergence, it is necessary to first solve a problem of authentication on access of a user to the WiMAX network. To implement authentication on access of a WiFi user to the WiMAX network, an embodiment of the present invention discloses a system as shown in FIG. 2a.

Figure 2A:
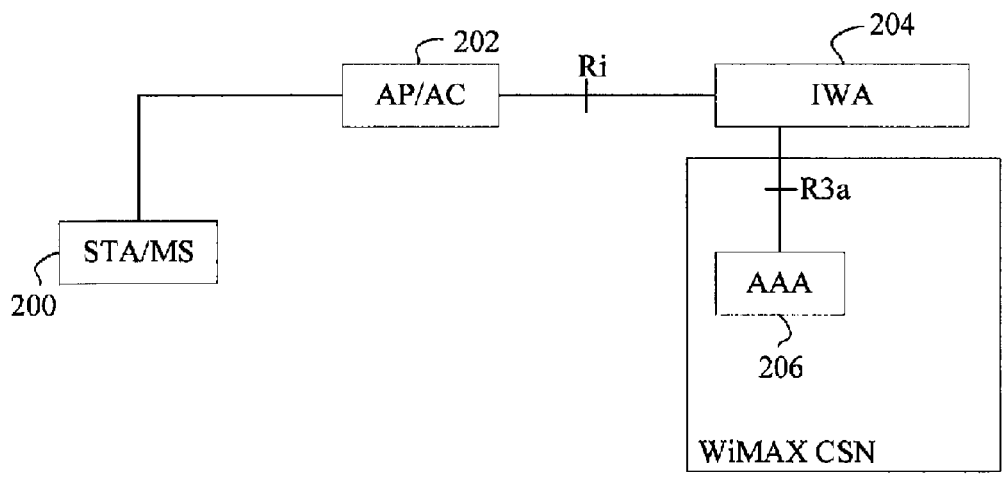
FIG. 2a is an architecture diagram of a system for converging WiMAX and WiFi networks according to an embodiment of the present invention.

Referring to FIG. 2a, in a WiFi system, a device that a user directly uses is called an STA, while the device is called an MS in a WiMAX system. In this embodiment, the device is not distinguished and called an STA/MS, that is, an STA/MS 200 as shown in the figure. The STA/MS 200 establishes a communication connection with an AP/AC 202 through an air interface defined by the 802.11 protocol. As described above, in fact, the STA/MS 200 establishes a communication connection with an AP through an air interface defined by the 802.11 protocol. However, in this embodiment of the present invention, whether an AC is deployed in the system is not limited, and communication between the AP and the AC is also not limited (as described above, the communication between the AP and the AC mostly adopts a private protocol of respective manufacturers in an existing WiFi network deployment), but the AP and the AC are regarded as an integral black box, called AP/AC (that is, the AP/AC 202 as shown in the figure). One end of the AP/AC 202 establishes a communication connection with the STA/MS 200 through an air interface defined by the 802.11 protocol, and the other end establishes a communication connection with an IWA 204 through a Ri interface defined in this embodiment of the present invention. The IWA 204 is a function convergence module defined in this embodiment of the present invention, which may be located between the AP/AC and the WiMAX CSN as an independent functional entity, and may also be located in the WiMAX CSN. Certainly, the IWA 204 may also be located in a WiMAX ASN that is not shown. This embodiment of the present invention does not limit the specific location of the IWA 204, which may be flexibly deployed depending on service division of an operator or another factor. The IWA 204 also establishes a communication connection with an AAA 206 through an R3a interface defined in this embodiment of the present invention. As shown in the figure, the AAA 206 is located in the WiMAX CSN.

Figure 1:
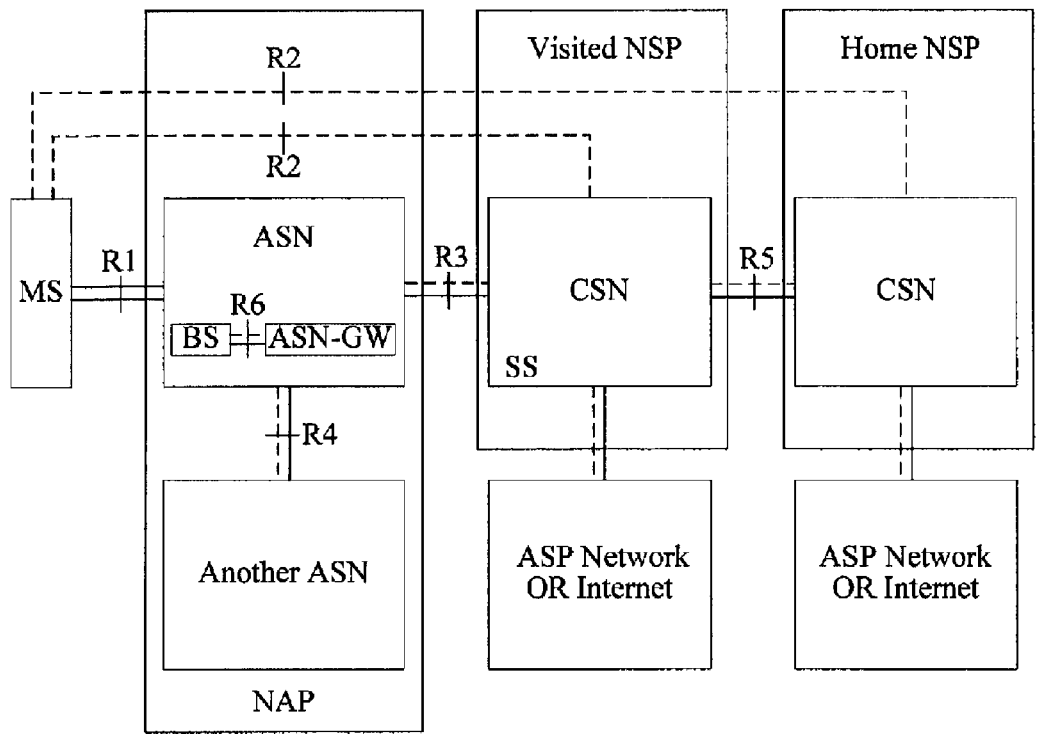
FIG. 1 is a reference model of a WiMAX network architecture in the prior art.

The Ri interface is a communication interface between the AP/AC 202 and the IWA 204, and provides control-plane communication services between the AP/AC 202 and the WiMAX CSN, which may be borne by an IP based or Layer 3 protocol. The R3a interface is a communication interface between the IWA 204 and the AAA 206, and is configured to transmit information between the AP/AC 202 and the AAA 206, and corresponds to a control plane of the R3 interface (as shown in FIG. 1) between the ASN GW and the CSN that are in the WiMAX system.

In the system shown in FIG. 2a, the IWA 204 is configured to perform access control on the terminal STA/MS 200 accessing the CSN from the WiFi network.

Specifically, the IWA 204 may be configured to receive an access authentication message from the AP/AC 202, where the access authentication message carries identity information of the STA/MS 200, and the IWA 204 forwards the access authentication message to the AAA 206, so that the AAA 206 performs access authentication on the STA/MS 200. The IWA 204 is further configured to receive an access authentication response message from the AAA 206, and forward the access authentication response message to the AP/AC 202. The AP/AC 202 is configured to initiate an authentication request to the STA/MS 200, and receive an authentication response from the STA/MS 200, where the authentication response carries identity information of the STA/MS 200. The AP/AC 202 is further configured to send the access authentication message to the IWA 204, and the access authentication message carries the identity information of the STA/MS 200. In this deployment scenario, the IWA 204 functions as a proxy server of the AAA 206 (AAA proxy).

Alternatively, the IWA 204 may be configured to send an access authentication request message to the STA/MS 200, and receive an access authentication message from the STA/MS 200, where the access authentication message carries identity information of the STA/MS 200. The IWA 204 forwards the access authentication message to the AAA 206, so that the AAA 206 performs access authentication on the STA/MS 200. The IWA 204 is further configured to receive an access authentication response message from the AAA 206, and forward the access authentication response message to the STA/MS 200. The AP/AC 202 is configured to forward the access authentication message and the access authentication response message that are exchanged between the STA/MS 200 and the IWA 204. In this deployment scenario, the IWA 204 functions as an authenticator in the WiMAX system.

Specifically, the identity information of the STA/MS 200 may be an identifier of the STA/MS 200, or a user account and password of the STA/MS 200, or other identity information that may be used to authenticate a terminal in the WiMAX system, which are not limited in this embodiment of the present invention. The STA/MS 200 needs to adopt the form defined by the 802.11 protocol when reporting the identity information to the AP/AC 202. When sending the identity information to the IWA 204, the AP/AC 202 needs, according to the definition of the Ri interface, to use an IP based or Layer 3 protocol to bear the information. Similarly, information exchange between the STA/MS 200 and the IWA 204 needs the AP/AC 202 to perform protocol conversion and forwarding. Likewise, communication between the IWA 204 and the AAA 206 adopts a protocol defined by WiMAX, for example, a RADIUS protocol. Therefore, communication between the AP/AC 202 and the AAA 206 needs the IWA 204 to perform protocol conversion and forwarding.

By using the system for converging WiMAX and WiFi networks disclosed in this embodiment, access authentication on the STA/MS 200 in the WiMAX network may be implemented, and convergence between WiFi network access authentication and WiMAX CSN access authentication is implemented, so that the STA/MS 200 may access the WiMAX CSN through a single authentication.

Figure 2B:
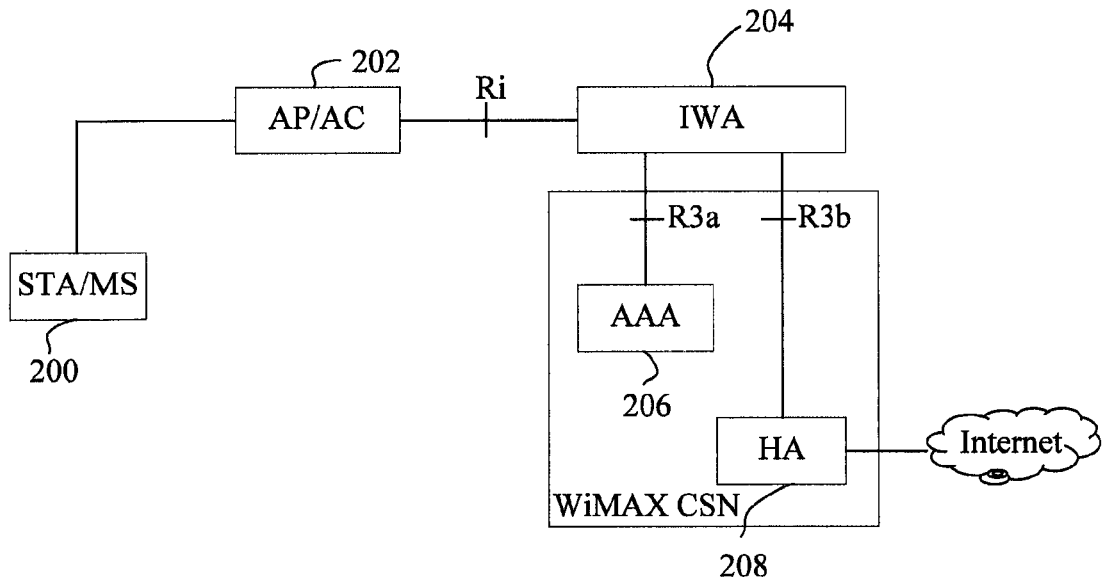
FIG. 2b is an architecture diagram of an expanded system for converging WiMAX and WiFi networks according to an embodiment of the present invention.

Further, another embodiment of the present invention expands the system for converging WiMAX and WiFi networks, where the system is shown in FIG. 2a, so that the STA/MS 200 may further implement MIP registration through the WiMAX CSN, establish a data channel, and implement access to the Internet. This embodiment is as shown in FIG. 2b. FIG. 2b inherits the network architecture shown in FIG. 2a, and further defines an R3b interface, so that the IWA 204 establishes a communication connection with an HA 208 through the R3b interface. The HA 208 establishes a communication connection with the Internet according to the definition of the WiMAX system. The R3b interface is used for MIP registration, MIP tunnel establishment, and data forwarding between the IWA 204 and the HA 208, and corresponds to a data plane of the R3 interface (as shown in FIG. 1) between the ASN GW and the CSN in the WiMAX system.

In the system shown in FIG. 2b, the IWA 204, in addition to having the function of the IWA 204 in the system as shown in FIG. 2a, is further configured to, after access authentication on the STA/MS 200 is successful, allocate a care of address (CoA) to the STA/MS 200, serve as a MIP client to trigger a foreign agent (FA) function deployed on the IWA 204 to replace the STA/MS 200 and send a MIP registration request to the HA 208, and register the CoA of the terminal to the HA 208; and receive a MIP registration response from the HA 208, and after the registration is successful, establish a MIP tunnel between the IWA 204 and the HA 208. In this way, the subsequent data transmission may adopt this MIP tunnel. Correspondingly, the Ri interface also provides data-plane communication services between the AP/AC 202 and the IWA 204.

The foregoing describes the function of the IWA 204 in the scenario that the system registers by using a Proxy Mobile Internet Protocol (PMIP) manner. However, in the scenario that the system registers by using a Client Mobile Internet Protocol (CMIP), the STA/MS 200 directly performs MIP registration in the system shown in FIG. 2b, and establishes a MIP tunnel between the STA/MS 200 and the HA 208 if a CMIPv6 registration mode is adopted, and the IWA 204 only serves as a forwarding node in the middle of the tunnel. If a CMIPv4 registration mode is adopted, the STA/MS 200 firstly sends a MIP registration request to the IWA 204, an FA function is deployed on the IWA 204, MIP registration is performed between the IWA 204 and the HA 208, the IWA 204 forwards a MIP registration response message to the STA/MS 200 after the registration is completed, and a MIP tunnel is established between the IWA 204 and the HA 208.

By using the system disclosed in this embodiment, the STA/MS 200 may access the WiMAX system through a WiFi access network, complete access authentication and MIP registration, establish a MIP tunnel, and use network services.

Figure 2C:
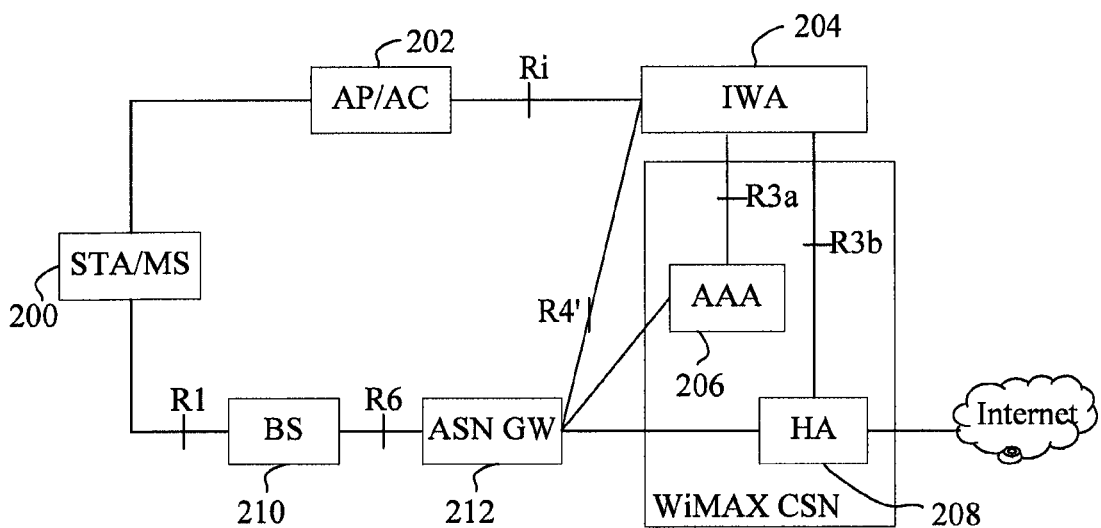
FIG. 2c is an architecture diagram of an expanded system for converging WiMAX and WiFi networks according to an embodiment of the present invention.

However, the system still cannot implement handover of the STA/MS 200 between the WiFi access network and the WiMAX access network, and still cannot support cross-access network seamless connection of the STA/MS 200. An exemplary embodiment of the present invention further expands the system shown in FIG. 2b, so as to implement seamless handover between the WiFi access network and the WiMAX access network. The system is as shown in FIG. 2c. The STA/MS 200 may access a BS 210 through an R1 interface, and the BS 210 is connected to an ASN GW 212 through an R6 interface in a communicable manner. The ASN GW 212 establishes a communication connection with various entities in the WiMAX CSN according to the definition of the WiMAX system, so as to implement network access of the STA/MS to the WiMAX system. This network access manner fully conforms to the existing WiMAX related protocols. The IWA 204 further establishes a communication connection with the ASN GW 212 through an R4' interface defined in this embodiment of the present invention, where the R4' interface corresponds to the R4 interface (as shown in FIG. 1) in the WiMAX network, and is mainly configured to perform context transfer and data integrity protection between the WiMAX network and a WiFi network during the handover. For example, in the process that the STA/MS 200 performs handover between the AP/AC 202 and the BS 210 (this embodiment of the present invention does not limit the direction of the handover, which may be handed over from the AP/AC 202 to the BS 210, or from the BS 210 to the AP/AC 202), the AP/AC 202 and the ASN GW 212 may perform, through the R4' interface, context transfer of the STA/MS 200 through the IWA 204, so as to ensure service continuity. Meanwhile, in the handover process, the IWA 204 may also buffer uplink and/or downlink data of the STA/MS 200 in an original network, and forward the data to the target network after the handover is successful, so as to protect data integrity.

By using the system disclosed in this embodiment, the STA/MS may perform seamless handover between the WiFi access network (that is, the AP/AC 202) and the WiMAX access network (that is, the BS 210 and the ASN GW 212), so as to ensure service continuity and data integrity in the handover.

As described above, the system shown in FIG. 2c provides services such as common authentication, MIP tunnel establishment, and seamless handover for access of the STA/MS 200 to the WiMAX network through the AP/AC 202. In the process of providing wireless network access services, a WiMAX CSN operator generally has requirements for user accounting. To support accounting of the WiMAX CSN on the STA/MS 200 accessing through the AP/AC 202, an exemplary embodiment of the present invention further discloses a system for converging WiMAX and WiFi. The system according to this embodiment of the present invention may be embodied in the system shown in FIG. 2a, FIG. 2b, or FIG. 2c. Specifically, the IWA 204 may further implement an accounting agent function and an accounting client function. When the IWA 204 implements the accounting agent function, the IWA 204 is configured to collect accounting information, such as the number of bytes and duration that correspond to a service flow data packet, during the period that the STA/MS 200 accesses the WiMAX CSN from the AP/AC 202, and report the collected accounting information to the accounting client. When the IWA 204 implements the accounting client function, the IWA 204 is configured to generate an accounting packet according to the accounting information reported by the accounting agent, for example, a user data record (UDR), and report the accounting packet to the AAA 206 for the AAA 206 to perform accounting. As a deployment method, the accounting agent function may also be implemented on the AP/AC 202, and the IWA 204 only implements the accounting client function.

By using the system disclosed in this embodiment, the accounting of the WiMAX CSN on the STA/MS 200 may be implemented when the STA/MS 200 accesses the WiMAX CSN through the AP/AC 202.

Further, as an exemplary embodiment of the present invention, the system shown in FIG. 2a, FIG. 2b, or FIG. 2c may further deploy at least one of the following functions on the IWA 204:

WiFi gateway function: equivalent to a gateway or firewall for access of WiFi to the WiMAX CSN;

traffic control function: configured to filter non-encrypted information in a data packet, where only the data packet or related signaling message in the MIP tunnel is forwarded, so as to ensure accurate routing of the data packet; and security control enhancement function: configured to establish an IPsec tunnel between the IWA 204 and the STA/MS 200 or the AP/AC 202, so as to enhance data security of WiFi access.

It should be further noted that, the IWA 204 may be a single network functional entity that integrates one or more functions according to deployment of the foregoing embodiments, or may be a logical entity that is configured to implement the one or more functions by scheduling existing resources in the WiMAX network, so that various functions are still allocated to respective functional entities in the existing WiMAX system for specific implementation.

By using the system for converging WiMAX and WiFi networks disclosed in the foregoing embodiments of the present invention, convergence of one or more functions between the WiFi and WiMAX networks may be implemented conveniently.

Another embodiment of the present invention further discloses another system for converging WiMAX and WiFi networks. The system is as shown in FIG. 3.

Figure 3:
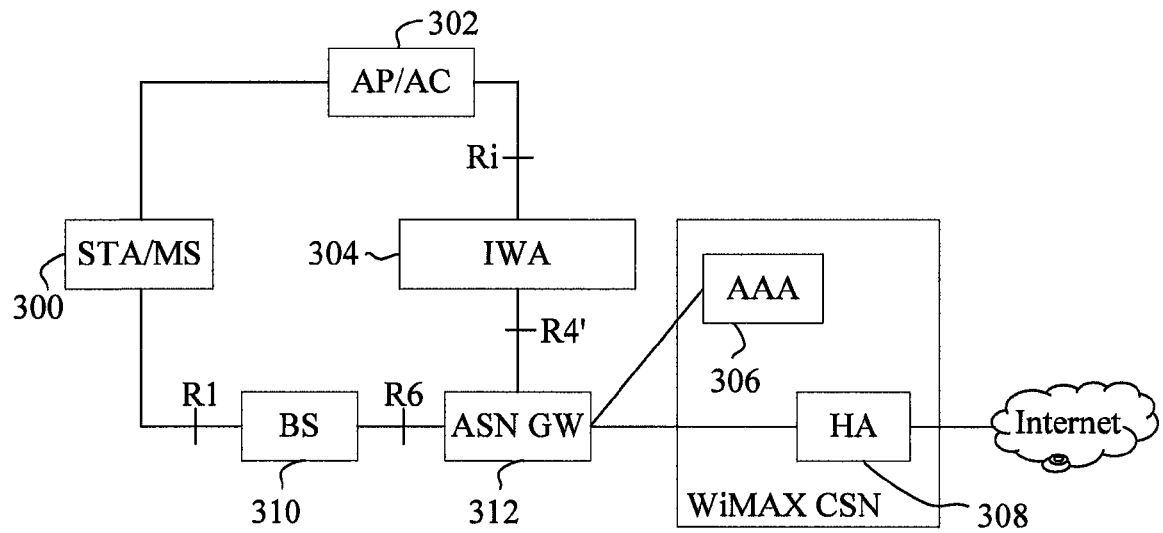
FIG. 3 is an architecture diagram of a system for converging WiMAX and WiFi networks according to an embodiment of the present invention.

Referring to FIG. 3, an STA/MS 300 may access the WiMAX CSN through a WiMAX access network. When the STA/MS 300 accesses the WiMAX CSN through the WiMAX access network, the STA/MS 300 accesses a BS 310 through an R1 interface, and the BS 310 establishes a communication connection with an ASN GW 312 through an R6 interface. The ASN GW 312 establishes a communication connection with an AAA 306 and an HA 308 in the WiMAX CSN in a manner defined by the WiMAX system. The preceding connections and various service processes are all implemented according to the existing definition of WiMAX. The STA/MS 300 may also access the WiMAX CSN through an AP/AC 302. If the STA/MS 300 accesses the WiMAX CSN through the AP/AC 302, the STA/MS 300 establishes a communication connection with the AP/AC 302 through an air interface defined by the 802.11 protocol. As described above, in fact, the STA/MS 300 establishes a communication connection with an AP through an air interface defined by the 802.11 protocol. However, in this embodiment of the present invention, whether an AC is deployed in the system is not limited, and communication between the AP and the AC is also not limited (as described above, the communication between the AP and the AC mostly adopts a private protocol of respective manufacturers in an existing WiFi network deployment), but the AP and the AC are regarded as an integral black box, called AP/AC (that is, the AP/AC 302 as shown in the figure). One end of the AP/AC 302 establishes a communication connection with the STA/MS 300 through an air interface defined by the 802.11 protocol, and the other end establishes a communication connection with an IWA 304 through a Ri interface defined in this embodiment of the present invention. The IWA 304 is a function convergence module defined in this embodiment of the present invention, which may be located between the AP/AC and the ASN GW 312 as an independent functional entity, and may also be located on the ASN GW 312. This embodiment of the present invention does not limit the specific location of the IWA 304, which may be flexibly deployed depending on service division of an operator or another factor. The IWA 304 establishes a communication connection with the ASN GW 312 through the R4' interface defined in this embodiment of the present invention.

The Ri interface is a communication interface between the AP/AC 302 and the IWA 304, and provides control-plane and data-plane communication services between the AP/AC 302 and the WiMAX CSN, which may be borne by an IP based or Layer 3 protocol. The R4' interface corresponds to the R4 interface (as shown in FIG. 1) between the ASN GWs in the WiMAX network, and is configured to transmit authentication, authorization, and accounting information between the AP/AC 302 and the AAA 306; configured to implement MIP registration, MIP tunnel establishment, and data forwarding between the IWA 304 and the HA 308; and configured to perform context transfer and data integrity protection between an original network and a target network during the handover. If the IWA 304 is deployed on the ASN GW 312, the R4' interface may be implemented by using an internal protocol of the ASN GW 312.

In the system shown in FIG. 3, the IWA 304 is configured to perform access control on the terminal STA/MS 300 accessing the ASN GW 312 from the WiFi network.

Specifically, the IWA 304 may be configured to receive an access authentication message from the AP/AC 302, where the access authentication message carries identity information of the STA/MS 300, the IWA 304 forwards the access authentication message to the ASN GW 312, and the ASN GW 312 forwards the access authentication message to the AAA 306, so that the AAA 306 performs access authentication on the STA/MS 300; an access authentication response message is forwarded through the ASN GW 312 to the IWA 304, and the IWA 304 forwards the access authentication response message to the AP/AC 302. The AP/AC 302 is configured to initiate an authentication request to the STA/MS 300, and receive an authentication response from the STA/MS 300, where the authentication response carries the identity information of the STA/MS 300. The AP/AC 302 is further configured to send the access authentication message to the IWA 304, and the access authentication message carries the identity information of the STA/MS 300. In this deployment scenario, the IWA 304 functions as a proxy of the AAA 306.

Alternatively, the IWA 304 may be configured to send an access authentication request message to the STA/MS 300, and receive an access authentication message from the STA/MS 300, where the access authentication message carries identity information of the STA/MS 300; perform authentication on the STA/MS 300 according to the identity information, and return an authentication result to the STA/MS 300. The AP/AC 302 is configured to forward authentication messages exchanged between the STA/MS 300 and the IWA 304. In this deployment scenario, the IWA 304 functions as an authenticator in the WiMAX system. At this time, the IWA 304 may perform information exchange with the AAA 306 by using a same manner as that of the authenticator in the WiMAX system through the ASN GW 312, so as to obtain information required for authenticating the STA/MS 300.

Specifically, the identity information of the STA/MS 300 may be an identifier of the STA/MS 300, or a user account and password of the STA/MS 300, or other identity information that may be used to authenticate a terminal in the WiMAX system, which are not limited in this embodiment of the present invention. The STA/MS 300 needs to adopt the form defined by the 803.11 protocol when reporting the identity information to the AP/AC 302. When sending the identity information to the IWA 304, the AP/AC 302 needs, according to the definition of the Ri interface, to use an IP based or Layer 3 protocol to bear the information. Similarly, information exchange between the STA/MS 300 and the IWA 304 needs the AP/AC 302 to perform protocol conversion and forwarding. Likewise, communication between the IWA 304 and the ASN GW 312 adopts a protocol defined by WiMAX, for example, a RADIUS protocol. Therefore, communication between the AP/AC 302 and the ASN GW 312 needs the IWA 304 to perform protocol conversion and forwarding.

By using the system for converging WiMAX and WiFi networks disclosed in this embodiment, access authentication on the STA/MS 300 in the WiMAX network may be implemented, and convergence between WiFi network access authentication and WiMAX CSN access authentication is implemented, so that the STA/MS 300 may access the WiMAX CSN through a single authentication.

Further, another embodiment of the present invention may further expand the system for converging WiMAX and WiFi networks, where the system is shown in FIG. 3, so that the STA/MS 300 may further implement MIP registration through the WiMAX CSN, establish a data channel, and implement access to the Internet. In this embodiment, the IWA 304 is further configured to, after access authentication on the STA/MS 300 is successful, allocate a CoA to the STA/MS 300, serve as a MIP client to trigger an FA function deployed on the IWA 304 to replace the STA/MS 300 and send a MIP registration request to the HA 308, and register the CoA of the terminal to the HA 308; and receive a MIP registration response from the HA 308, and after the registration is successful, establish a MIP tunnel between the IWA 304 and the HA 308. In this way, the subsequent data transmission may adopt this MIP tunnel.

The foregoing describes the function of the IWA 304 in the scenario that the system registers by using a PMIP. However, in the scenario that the system registers by using a CMIP, the STA/MS 300 directly performs MIP registration, and establishes a MIP tunnel between the STA/MS 300 and the HA 308 if a CMIPv6 registration mode is adopted, and the IWA 304 only serves as a forwarding node in the middle of the tunnel. If a CMIPv4 registration mode is adopted, the STA/MS 300 firstly sends a MIP registration request to the IWA 304, an FA function is deployed on the IWA 304, MIP registration is performed between the IWA 304 and the HA 308, the IWA 304 forwards a MIP registration response message to the STA/MS 300 after the registration is completed, and a MIP tunnel is established between the IWA 304 and the HA 308. In the preceding description about the MIP registration, the communication between the IWA 304 and the HA 308 needs to be forwarded by the ASN GW 312 through the R4' interface. The specific protocol conversion has been discussed above, and the details are not repeatedly described here.

By using the system disclosed in this embodiment, the STA/MS 300 may access the WiMAX system through a WiFi access network, complete access authentication and MIP registration, establish a MIP tunnel, and use network services.

However, the system still cannot implement handover of the STA/MS 300 between the WiFi access network and the WiMAX access network, and cannot support cross-access network seamless connection of the STA/MS 300. An embodiment of the present invention further expands the system shown in FIG. 3, so as to implement seamless handover between the WiFi access network and the WiMAX access network. In the process that the STA/MS 300 performs handover between the AP/AC 302 and the BS 310 (this embodiment of the present invention does not limit the direction of the handover, which may be handed over from the AP/AC 302 to the BS 310, or from the BS 310 to the AP/AC 302), the AP/AC 302 and the ASN GW 312 may perform, through the R4' interface, context transfer of the STA/MS 300 through the IWA 304, so as to ensure service continuity. Meanwhile, in the handover process, the IWA 304 may also buffer uplink and/or downlink data of the STA/MS 300 in an original network, and forward the data to a target network after the handover is successful, so as to protect data integrity.

By using the system disclosed in this embodiment, the STA/MS may perform seamless handover between the WiFi access network (that is, the AP/AC 302) and the WiMAX access network (that is, the BS 310 and the ASN GW 312), so as to ensure service continuity and data integrity during the handover.

As described above, the system shown in FIG. 3 provides services such as common authentication, MIP tunnel establishment, and seamless handover for access of the STA/MS 300 to the WiMAX network through the AP/AC 302. In the process of providing wireless network access services, a WiMAX CSN operator generally has requirements for user accounting. To support accounting of the WiMAX CSN on the STA/MS 300 accessing through the AP/AC 302, an embodiment of the present invention further optimizes the system for converging WiMAX and WiFi shown in FIG. 3. Specifically, the IWA 304 may further implement an accounting agent function and an accounting client function. When the IWA 304 implements the accounting agent function, the IWA 304 is configured to collect accounting information, such as the number of bytes and duration that correspond to a service flow data packet, during the period that the STA/MS 300 accesses the WiMAX CSN from the AP/AC 302, and report the collected accounting information to the accounting client. When the IWA 304 implements the accounting client function, the IWA 304 is configured to generate an accounting packet according to the accounting information reported by the accounting agent, for example, a UDR, and report the accounting packet to the AAA 306 for the AAA 306 to perform accounting. As a deployment method, the accounting agent function may also be implemented on the AP/AC 302, and the IWA 304 only implements the accounting client function.

By using the system disclosed in this embodiment, the accounting of the WiMAX CSN on the STA/MS 300 may be implemented when the STA/MS 300 accesses the WiMAX CSN through the AP/AC 302.

Further, as an exemplary embodiment of the present invention, the system shown in FIG. 3 may further deploy at least one of the following functions on the IWA 304:

WiFi gateway function: equivalent to a gateway or firewall for access of WiFi to the WiMAX CSN;

traffic control function: configured to filter non-encrypted information in a data packet, where only the data packet or related signaling message in the MIP tunnel is forwarded, so as to ensure accurate routing of the data packet; and security control enhancement function: configured to establish an IPsec tunnel between the IWA 304 and the STA/MS 300 or the AP/AC 302, so as to enhance data security of WiFi access.

It should be further noted that, the IWA 304 may be a single network functional entity that integrates one or more functions according to deployment of the foregoing embodiments, or may be a logical entity that is configured to implement the one or more functions by scheduling existing resources in the WiMAX network, so that various functions are still allocated to respective functional entities in the existing WiMAX system for specific implementation.

By using the system for converging WiMAX and WiFi networks disclosed in the foregoing embodiments of the present invention, convergence of one or more functions between the WiFi and WiMAX networks may be implemented conveniently.

Figure 4:
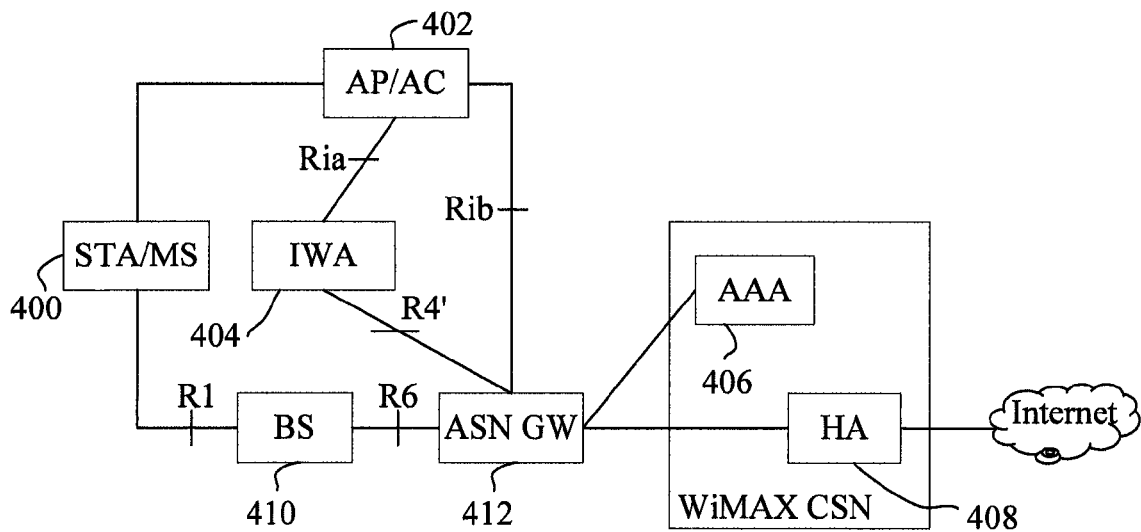
FIG. 4 is an architecture diagram of a system for converging WiMAX and WiFi networks according to an embodiment of the present invention.

The embodiment shown in FIG. 3 discloses a system for converging WiMAX and WiFi networks. An embodiment of the present invention discloses another system for converging WiMAX and WiFi networks. As shown in FIG. 4, the system for converging WiMAX and WiFi networks disclosed in this embodiment of the present invention is a varied deployment solution of the system shown in FIG. 3.

Referring to FIG. 4, an STA/MS 400 may access the WiMAX CSN through a WiMAX access network. When the STA/MS 400 accesses the WiMAX CSN through the WiMAX access network, the STA/MS 400 accesses a BS 410 through an R1 interface, and the BS 410 establishes a communication connection with an ASN GW 412 through an R6 interface. The ASN GW 412 establishes a communication connection with an AAA 406 and an HA 408 in the WiMAX CSN in a manner defined by the WiMAX system. The preceding connections and various service processes are all implemented according to the existing definition of WiMAX. The STA/MS 400 may also access the WiMAX CSN through an AP/AC 402. If the STA/MS 400 accesses the WiMAX CSN through the AP/AC 402, the STA/MS 400 establishes a communication connection with the AP/AC 402 through an air interface defined by the 802.11 protocol. As described above, in fact, the STA/MS 400 establishes a communication connection with an AP through an air interface defined by the 802.11 protocol. However, in this embodiment of the present invention, whether an AC is deployed in the system is not limited, and communication between the AP and the AC is also not limited (as described above, the communication between the AP and the AC mostly adopts a private protocol of respective manufacturers in the existing WiFi network deployment), but the AP and the AC are regarded as an integral black box, called AP/AC (that is, the AP/AC 402 as shown in the figure). One end of the AP/AC 402 establishes a communication connection with the STA/MS 400 through an air interface defined by the 802.11 protocol, and the other end establishes a communication connection with an IWA 404 through a Ria interface defined in this embodiment of the present invention, and meanwhile establishes a communication connection with the ASN GW 412 through a Rib interface defined in this embodiment of the present invention. The IWA 404 is a function convergence module defined in this embodiment of the present invention, which may be located between the AP/AC and the ASN GW 412 as an independent functional entity, and may also be located on the ASN GW 412. This embodiment of the present invention does not limit the specific location of the IWA 404, which may be flexibly deployed depending on service division of an operator or another factor. The IWA 404 establishes a communication connection with the ASN GW 412 through the R4' interface defined in this embodiment of the present invention.

The Ria interface is a communication interface between the AP/AC 402 and the IWA 404, and provides control-plane communication services between the AP/AC 402 and the WiMAX CSN, which may be borne by using an IP based or Layer 4 protocol. The R4' interface corresponds to the R4 interface (as shown in FIG. 1) between the ASN GWs in the WiMAX network, and is configured to transmit authentication, authorization, and accounting information between the AP/AC 402 and the AAA 406; and configured to perform context transfer between an original network and a target network during the handover. If the IWA 404 is deployed on the ASN GW 412, the R4' interface may be implemented by using an internal protocol of the ASN GW 412.

In the system shown in FIG. 4, the IWA 404 is configured to perform access control on the terminal STA/MS 400 accessing the ASN GW 412 from the WiFi network.

Specifically, the IWA 404 may be configured to receive an access authentication message from the AP/AC 402, where the access authentication message carries identity information of the STA/MS 400, the IWA 404 forwards the access authentication message to the ASN GW 412, and the ASN GW 412 forwards the access authentication message to the AAA 406, so that the AAA 406 performs access authentication on the STA/MS 400. An access authentication response message from the AAA 406 is forwarded through the ASN GW 412 to the IWA 404, and the IWA 404 forwards the access authentication response message to the AP/AC 402. The AP/AC 402 is configured to initiate an authentication request to the STA/MS 400, and receive an authentication response from the STA/MS 400, where the authentication response carries the identity information of the STA/MS 400. The AP/AC 402 is further configured to send the access authentication message to the IWA 404, and the access authentication message carries the identity information of the STA/MS 400. In this deployment scenario, the IWA 404 functions as a proxy of the AAA 406.

Alternatively, the IWA 404 may be configured to send an access authentication request message to the STA/MS 400, and receive an access authentication message from the STA/MS 400, where the access authentication message carries identity information of the STA/MS 400; perform authentication on the STA/MS 400 according to the identity information, and return an authentication result to the STA/MS 400. The AP/AC 402 is configured to forward authentication messages exchanged between the STA/MS 400 and the IWA 404. In this deployment scenario, the IWA 404 functions as an authenticator in the WiMAX system. At this time, the IWA 404 may perform information exchange with the AAA 406 by using a same manner as that of the authenticator in the WiMAX system through the ASN GW 412, so as to obtain information required for authenticating the STA/MS 400.

Specifically, the identity information of the STA/MS 400 may be an identifier of the STA/MS 400, or a user account and password of the STA/MS 400, or other identity information that may be used to authenticate a terminal in the WiMAX system, which are not limited in this embodiment of the present invention. The STA/MS 400 needs to adopt the form defined by the 804.11 protocol when reporting the identity information to the AP/AC 402. When sending the identity information to the IWA 404, the AP/AC 402 needs, according to the definition of the Ri interface, to use an IP based or Layer 4 protocol to bear the information. Similarly, information exchange between the STA/MS 400 and the IWA 404 needs the AP/AC 402 to perform protocol conversion and forwarding. Likewise, communication between the IWA 404 and the ASN GW 412 adopts a protocol defined by WiMAX, for example, a RADIUS protocol. Therefore, communication between the AP/AC 402 and the ASN GW 412 needs the IWA 404 to perform protocol conversion and forwarding.

By using the system for converging WiMAX and WiFi networks disclosed in this embodiment, access authentication on the STA/MS 400 in the WiMAX network may be implemented, and convergence between WiFi network access authentication and WiMAX CSN access authentication is implemented, so that the STA/MS 400 may access the WiMAX CSN through a single authentication.

Further, an embodiment of the present invention may further expand the system for converging WiMAX and WiFi networks, where the system is shown in FIG. 4, so that the STA/MS 400 may further implement MIP registration through the WiMAX CSN, establish a data channel, and implement access to the Internet. In this embodiment, the ASN GW 412 may perform data-plane communication with the AP/AC 402 through the Rib interface, so as to implement the MIP registration. After access authentication on the STA/MS 400 is successful, the IWA 404, as a MIP client, sends a MIP registration indication to the ASN GW 412, so as to trigger an FA function deployed on the ASN GW 412 to replace the STA/MS 400 and send a MIP registration request to the HA 408; a MIP registration response from the HA 408 is also forwarded to the IWA 404 through the ASN GW 412, and after the registration is successful, a MIP tunnel is established between the ASN GW 412 and the HA 408. In this way, the subsequent data transmission may adopt this MIP tunnel.

The foregoing describes the function of the ASN GW 412 in the scenario that the system registers by using a PMIP.

However, in the scenario that the system registers by using a CMIP, the STA/MS 400 directly performs MIP registration, and if a CMIPv6 registration mode is adopted, establishes a MIP tunnel between the STA/MS 400 and the HA 408, and the ASN GW 412 only serves as a forwarding node in the middle of the tunnel. If a CMIPv4 registration mode is adopted, the STA/MS 400 firstly sends a MIP registration request to the ASN GW 412, MIP registration is performed between an FA function deployed on the ASN GW 412 and the HA 408, the ASN GW 412 forwards a MIP registration response message to the STA/MS 400 after the registration is completed, and a MIP tunnel is established between the ASN GW 412 and the HA 408. During the process of the MIP registration, the communication required to be performed on the control plane for implementing the MIP registration needs to be transmitted through the Ria interface, the IWA 404, and the R4' interface.

By using the system disclosed in this embodiment, the STA/MS 400 may access the WiMAX system through a WiFi access network, complete access authentication and MIP registration, establish a MIP tunnel, and use network services.

However, the system still cannot implement handover of the STA/MS 400 between the WiFi access network and the WiMAX access network, and cannot support cross-access network seamless connection of the STA/MS 400. An embodiment of the present invention further expands the system shown in FIG. 4, so as to implement seamless handover between the WiFi access network and the WiMAX access network. In the process that the STA/MS 400 performs handover between the AP/AC 402 and the BS 410 (this embodiment of the present invention does not limit the direction of the handover, which may be handed over from the AP/AC 402 to the BS 410, or from the BS 410 to the AP/AC 402), the AP/AC 402 and the ASN GW 412 may perform, through the R4' interface, context transfer of the STA/MS 400 through the IWA 404, so as to ensure service continuity. Meanwhile, in the handover process, the ASN GW 412 may also buffer uplink and/or downlink data of the STA/MS 400 in an original network, and forward the data to a target network after the handover is successful, so as to protect data integrity.

By using the system disclosed in this embodiment, the STA/MS may perform seamless handover between the WiFi access network (that is, the AP/AC 402) and the WiMAX access network (that is, the BS 410 and the ASN GW 412), so as to ensure service continuity and data integrity in the handover.

As described above, the system shown in FIG. 4 provides services such as common authentication, MIP tunnel establishment, and seamless handover for access of the STA/MS 400 to the WiMAX network through the AP/AC 402. In the process of providing wireless network access services, a WiMAX CSN operator generally has requirements for user accounting. To support accounting of the WiMAX CSN on the STA/MS 400 accessing through the AP/AC 402, an embodiment of the present invention further optimizes the system for converging WiMAX and WiFi shown in FIG. 4. Specifically, the IWA 404 may further implement an accounting agent function and an accounting client function. When the IWA 404 implements the accounting agent function, the IWA 404 is configured to collect accounting information, such as the number of bytes and duration that correspond to a service flow data packet, during the period that the STA/MS 400 accesses the WiMAX CSN from the AP/AC 402, and report the collected accounting information to the accounting client. When the IWA 404 implements the accounting client function, the IWA 404 is configured to generate an accounting packet according to the accounting information reported by the accounting agent, for example, a UDR, and report the accounting packet to the AAA 406 for the AAA 406 to perform accounting. As a deployment method, the accounting agent function may also be implemented on the AP/AC 402, and the IWA 404 only implements the accounting client function.

By using the system disclosed in this embodiment, the accounting of the WiMAX CSN on the STA/MS 400 may be implemented when the STA/MS 400 accesses the WiMAX CSN through the AP/AC 402.

Further, as an exemplary embodiment of the present invention, the system shown in FIG. 4 may further deploy at least one of the following functions on the ASN GW 412:

WiFi gateway function: equivalent to a gateway or firewall for access of WiFi to the WiMAX CSN;

traffic control function: configured to filter non-encrypted information in a data packet, where only the data packet or related signaling message in the MIP tunnel is forwarded, so as to ensure accurate routing of the data packet; and security control enhancement function: configured to establish an IPsec tunnel between the ASN GW 412 and the STA/MS 400 or the AP/AC 402, so as to enhance data security of WiFi access.

It should be further noted that, the IWA 404 may be a single network functional entity that integrates one or more functions according to deployment of the foregoing embodiments, or may be a logical entity that is configured to implement the one or more functions by scheduling existing resources in the WiMAX network, so that various functions are still allocated to respective functional entities in the existing WiMAX system for specific implementation.

By using the system for converging WiMAX and WiFi networks disclosed in the foregoing embodiments of the present invention, convergence of one or more functions between the WiFi and WiMAX networks may be implemented conveniently.

It can be seen from the embodiments shown in FIG. 2*a*, FIG. 2*b*, FIG. 2*c*, and FIG. 3 that, the communication between the AP/AC and the WiMAX network must be relayed by the IWA. In the embodiment shown in FIG. 4, the control plane and the data plane of the communication between the AP/AC and the WiMAX network have been distinguished, and different interfaces are respectively configured. An embodiment of the present invention further discloses another system for converging WiMAX and WiFi networks. The system still adopts the solution of distinguishing the control plane and the data plane of the communication between the AP/AC and the WiMAX network, but avoids changes to the existing WiMAX access network.

Figure 5A:
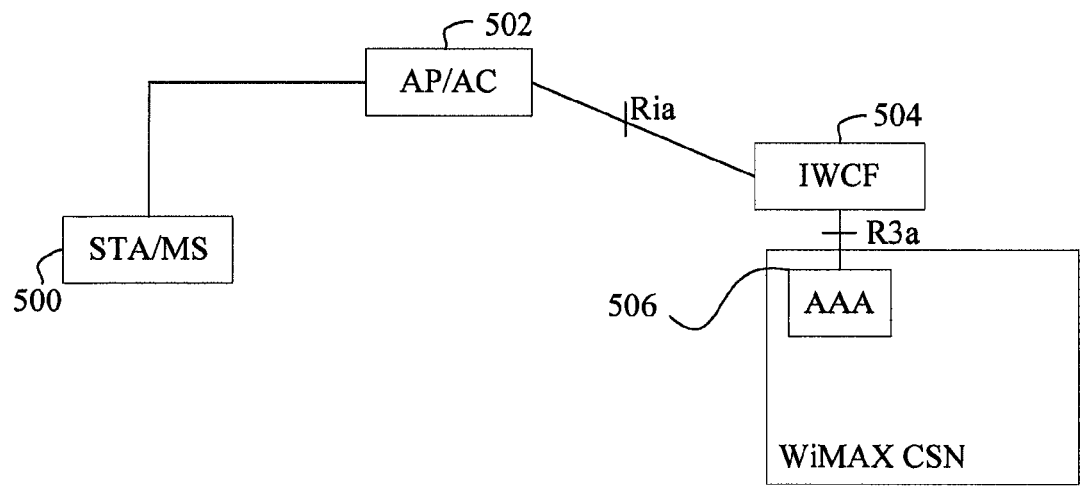
FIG. 5a is an architecture diagram of a system for converging WiMAX and WiFi networks according to an embodiment of the present invention.

Referring to FIG. 5*a*, an STA/MS 500 establishes a communication connection with an AP/AC 502 through an air interface defined by the 802.11 protocol. As described above, in fact, the STA/MS 500 establishes a communication connection with an AP through an air interface defined by the 802.11 protocol. However, in this embodiment of the present invention, whether an AC is deployed in the system is not limited, and communication between the AP and the AC is also not limited (as described above, the communication between the AP and the AC mostly adopts a private protocol of respective manufacturers in the existing WiFi network deployment), but the AP and the AC are regarded as an integral black box, called AP/AC (that is, the AP/AC 502 as shown in the figure). One end of the AP/AC 502 establishes a communication connection with the STA/MS 500 through an air interface defined by the 802.11 protocol, and the other end establishes a communication connection with an IWCF 504 through a Ria interface defined in this embodiment of the present invention. The IWCF 504 is a function convergence module defined in this embodiment of the present invention, which may be located between the AP/AC and the WiMAX CSN as an independent functional entity, and may also be located in the WiMAX CSN. Certainly, the IWCF 504 may also be located in a WiMAX ASN not shown. This embodiment of the present invention does not limit the specific location of the IWCF 504, which may be flexibly deployed depending on service division of an operator or another factor. The IWCF 504 also establishes a communication connection with an AAA 506 through an R3*a* interface defined in this embodiment of the present invention. As shown in the figure, the AAA 506 is located in the WiMAX CSN.

The Ria interface is a communication interface between the AP/AC 502 and the IWCF 504, and provides control-plane communication services between the AP/AC 502 and the WiMAX CSN, which may be borne by using an IP based or Layer 3 protocol. The R3*a* interface is a communication interface between the IWCF 504 and the AAA 506, and corresponds to a control plane of the R3 interface (as shown in FIG. 1) between the ASN GW and the CSN in the WiMAX system.

In the system shown in FIG. 5*a*, the IWCF 504 is configured to perform access control on the terminal STA/MS 500 accessing the CSN from the WiFi network.

Specifically, the IWCF 504 may be configured to receive an access authentication message from the AP/AC 502, where the access authentication message carries identity information of the STA/MS 500, and the IWCF 504 forwards the access authentication message to the AAA 506, so that the AAA 506 performs access authentication on the STA/MS 500. The IWCF 504 is further configured to receive an access authentication response message from the AAA 506, and forward the access authentication response message to the AP/AC 502. The AP/AC 502 is configured to initiate an authentication request to the STA/MS 500, and receive an authentication response from the STA/MS 500, where the authentication response carries the identity information of the STA/MS 500. The AP/AC 502 is further configured to send the access authentication message to the IWCF 504, and the access authentication message carries the identity information of the STA/MS 500. In this deployment scenario, the IWCF 504 functions as a proxy of the AAA 506.

Alternatively, the IWCF 504 may be configured to send an access authentication request message to the STA/MS 500, and receive an access authentication message from the STA/MS 500, where the access authentication message carries identity information of the STA/MS 500; perform authentication on the STA/MS 500 according to the identity information, and return an authentication result to the STA/MS 500. The AP/AC 502 is configured to forward authentication messages exchanged between the STA/MS 500 and the IWCF 504. In this deployment scenario, the IWCF 504 functions as an authenticator in the WiMAX system. At this time, the IWCF 504 may perform information exchange with the AAA 506 by using the same manner as that of the authenticator in the WiMAX system, so as to obtain information required for authenticating the STA/MS 500.

Specifically, the identity information of the STA/MS 500 may be an identifier of the STA/MS 500, or a user account and password of the STA/MS 500, or other identity information that may be used to authenticate a terminal in the WiMAX system, which are not limited in this embodiment of the present invention. The STA/MS 500 needs to adopt the form defined by the 805.11 protocol when reporting the identity information to the AP/AC 502. When sending the identity information to the IWCF 504, the AP/AC 502 needs, according to the definition of the Ria interface, to use an IP based or Layer 3 protocol to bear the information. Similarly, information exchange between the STA/MS 500 and the IWCF 504 needs the AP/AC 502 to perform protocol conversion and forwarding. Likewise, communication between the IWCF 504 and the AAA 506 adopts a protocol defined by WiMAX, for example, a RADIUS protocol. Therefore, communication between the AP/AC 502 and the AAA 506 needs the IWCF 504 to perform protocol conversion and forwarding.

By using the system for converging WiMAX and WiFi networks disclosed in this embodiment, access authentication on the STA/MS 500 in the WiMAX network may be implemented, and convergence between WiFi network access authentication and WiMAX CSN access authentication is implemented, so that the STA/MS 500 may access the WiMAX CSN through a single authentication.

Figure 5B:
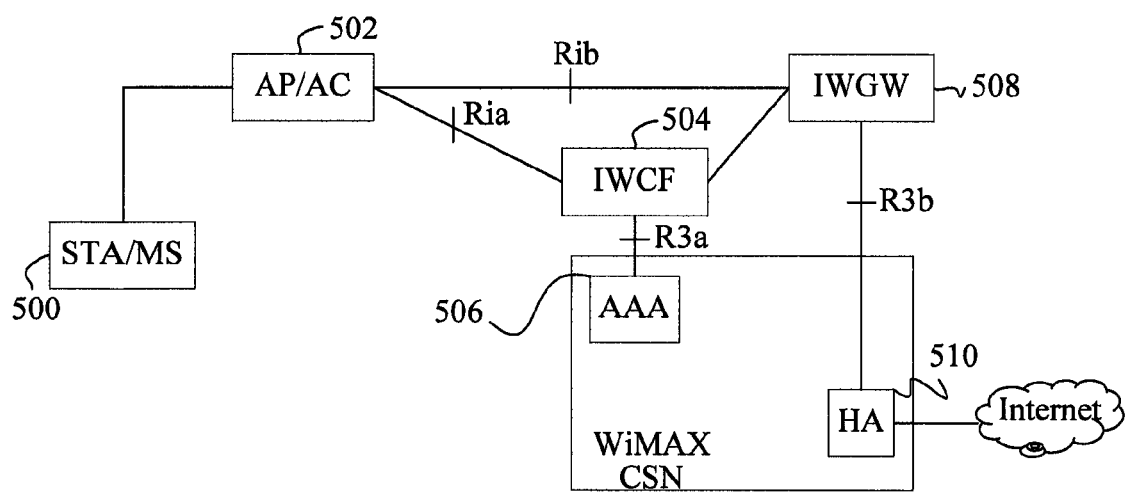
FIG. 5b is an architecture diagram of an expanded system for converging WiMAX and WiFi networks according to an embodiment of the present invention.

Further, another embodiment of the present invention expands the system for converging WiMAX and WiFi networks, where the system is shown in FIG. 5*a*, so that the STA/MS 500 may further implement MIP registration through the WiMAX CSN, establish a data channel, and implement access to the Internet. This embodiment is as shown in FIG. 5*b*. FIG. 5*b* inherits the network architecture shown in FIG. 5*a*, and further defines a Rib interface, an IWGW 508, and an R3*b* interface, so that the AP/AC 502 establishes a communication connection with an HA 510 through the Rib interface, the IWGW 508, and the R3*b* interface. The HA 510 establishes a communication connection with the Internet according to the definition of the WiMAX system. The R3*b* interface is used for MIP registration, MIP tunnel establishment, and data forwarding between the IWGW 508 and the HA 510, and corresponds to a data plane of the R3 interface (as shown in FIG. 1) between the ASN GW and the CSN in the WiMAX system.

In the system shown in FIG. 5*b*, after access authentication on the STA/MS 500 is successful, the IWCF 504, as a MIP client, sends a MIP registration indication to the IWGW 508, so as to trigger an FA function on the IWGW 508 to replace the STA/MS 500 and send a MIP registration request to the HA 510; a MIP registration response from the HA 510 is also forwarded to the IWCF 504 through the IWGW 508, and after the registration is successful, a MIP tunnel is established between the IWGW 508 and the HA 510. In this way, the subsequent data transmission may adopt this MIP tunnel.

The foregoing describes the function of the IWGW 508 in the scenario that the system registers by using a PMIP. However, in the scenario that the system registers by using a CMIP, the STA/MS 500 directly performs MIP registration in the system shown in FIG. 5*b*, and establishes a MIP tunnel between the STA/MS 500 and the HA 510 if a CMIPv6 registration mode is adopted, and the IWGW 508 only serves as a forwarding node in the middle of the tunnel. If a CMIPv4 registration mode is adopted, the STA/MS 500 firstly sends a MIP registration request to the IWGW 508, an FA function is deployed on the IWGW 508, MIP registration is performed between the IWGW 508 and the HA 510, the IWGW 508 forwards a MIP registration response message to the STA/MS 500 after the registration is completed, and a MIP tunnel is established between the IWGW 508 and the HA 510.

A communication connection also needs to be established between the IWGW 508 and the IWCF 504, so as to transmit authentication information and MIP registration information.

By using the system disclosed in this embodiment, the STA/MS 500 may access the WiMAX system through a WiFi access network, complete access authentication and MIP registration, establish a MIP tunnel, and use network services.

Figure 5C:
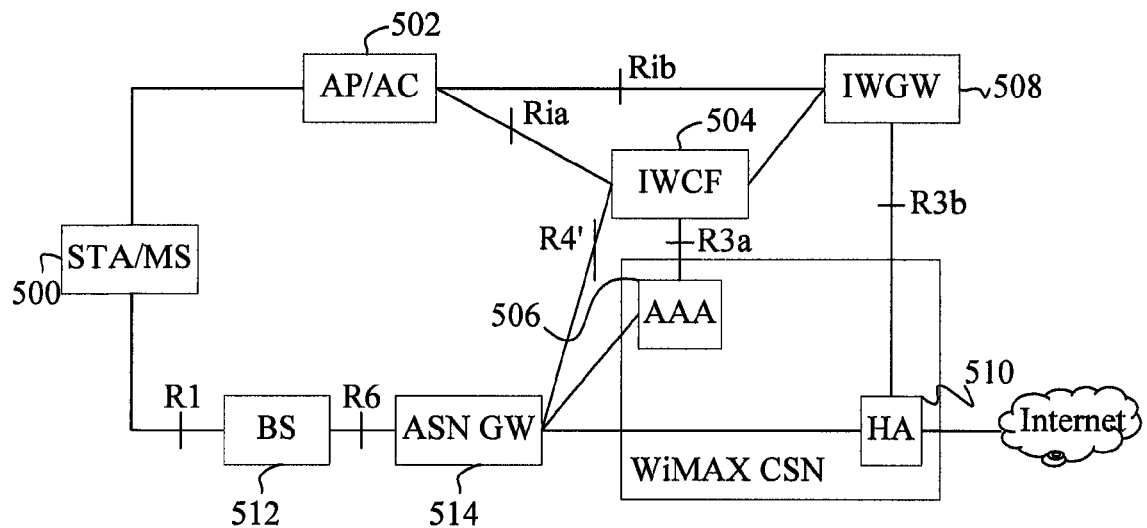
FIG. 5c is an architecture diagram of an expanded system for converging WiMAX and WiFi networks according to an embodiment of the present invention.

However, the system still cannot implement handover of the STA/MS 500 between the WiFi access network and the WiMAX access network, and cannot support cross-access network seamless connection of the STA/MS 500. An exemplary embodiment of the present invention further expands the system shown in FIG. 5*b*, so as to implement seamless handover between the WiFi access network and the WiMAX access network. The system is as shown in FIG. 5*c*. The STA/MS 500 may access a BS 512 through an R1 interface, and the BS 512 is connected to an ASN GW 514 through an R6 interface in a communicable manner. The ASN GW 514 establishes a communication connection with various entities in the WiMAX CSN according to the definition of the WiMAX system, so as to implement network access of the STA/MS to the WiMAX system. This network access manner fully conforms to the existing WiMAX related protocols. The IWCF 504 further establishes a communication connection with the ASN GW 514 through the R4' interface defined in this embodiment of the present invention. The R4' interface corresponds to the R4 interface (as shown in FIG. 1) in the WiMAX network, and is mainly configured to perform context transfer and data integrity protection between the WiMAX network and a WiFi network during the handover. For example, in the process that the STA/MS 500 performs handover between the AP/AC 502 and the BS 512 (this embodiment of the present invention does not limit the direction of the handover, which may be handed over from the AP/AC 502 to the BS 512, or from the BS 512 to the AP/AC 502), the AP/AC 502 and the ASN GW 514 perform, through the R4' interface, context transfer of the STA/MS 500 through the IWCF 504, so as to ensure service continuity. Meanwhile, in the handover process, the IWGW 508 may also buffer uplink and/or downlink data of the STA/MS 500 in an original network, and forward the data to a target network after the handover is successful, so as to protect data integrity. At this time, it is necessary to use an interface between the IWCF 504 and the IWGW 508 to implement combination of the control plane and the data plane.

By using the system disclosed in this embodiment, the STA/MS may perform seamless handover between the WiFi access network (that is, the AP/AC 502) and the WiMAX access network (that is, the BS 512 and the ASN GW 514), so as to ensure service continuity and data integrity during the handover.

As described above, the system shown in FIG. 5*c* provides services such as common authentication, MIP tunnel establishment, and seamless handover for access of the STA/MS 500 to the WiMAX network through the AP/AC 502. In the process of providing wireless network access services, a WiMAX CSN operator generally has requirements for user accounting. To support accounting of the WiMAX CSN on the STA/MS 500 accessing through the AP/AC 502, an exemplary embodiment of the present invention further discloses a system for converging WiMAX and WiFi. The system according to this embodiment of the present invention may be embodied in the system shown in FIG. 5*a*, FIG. 5*b*, or FIG. 5*c*. Specifically, the IWCF 504 may further implement an accounting agent function and an accounting client function. When the IWCF 504 implements the accounting agent function, the IWCF 504 is configured to collect accounting information, such as the number of bytes and duration that correspond to a service flow data packet, during the period that the STA/MS 500 accesses the WiMAX CSN from the AP/AC 502, and report the collected accounting information to the accounting client. When the IWCF 504 implements the accounting client function, the IWCF 504 is configured to generate an accounting packet according to the accounting information reported by the accounting agent, for example, a UDR, and report the accounting packet to the AAA 506 for the AAA 506 to perform accounting. As a deployment method, the accounting agent function may also be implemented on the AP/AC 502, and the IWCF 504 only implements the accounting client function. In this scenario, charging policy exchange may be further performed between the IWCF 504 and the IWGW 508.

By using the system disclosed in this embodiment, the accounting of the WiMAX CSN on the STA/MS 500 may be implemented when the STA/MS 500 accesses the WiMAX CSN through the AP/AC 502.

Further, as an exemplary embodiment of the present invention, the system shown in FIG. 5a, FIG. 5b, or FIG. 5c may further deploy at least one of the following functions on the IWGW 508:

WiFi gateway function: equivalent to a gateway or firewall for access of WiFi to the WiMAX CSN;

traffic control function: configured to filter non-encrypted information in a data packet, where only the data packet or related signaling message in the MIP tunnel may be forwarded, so as to ensure accurate routing of the data packet; and security control enhancement function: configured to establish an IPsec tunnel between the IWGW 508 and the STA/MS 500 or the AP/AC 502, so as to enhance data security of WiFi access.

It should be further noted that, the IWCF 504 and the IWGW 508 may be a single network functional entity that integrates one or more functions according to deployment of the foregoing embodiments, or may be a logical entity that is configured to implement the one or more functions by scheduling existing resources in the WiMAX network, so that various functions are still allocated to respective functional entities in the existing WiMAX system for specific implementation.

Figure 5D:
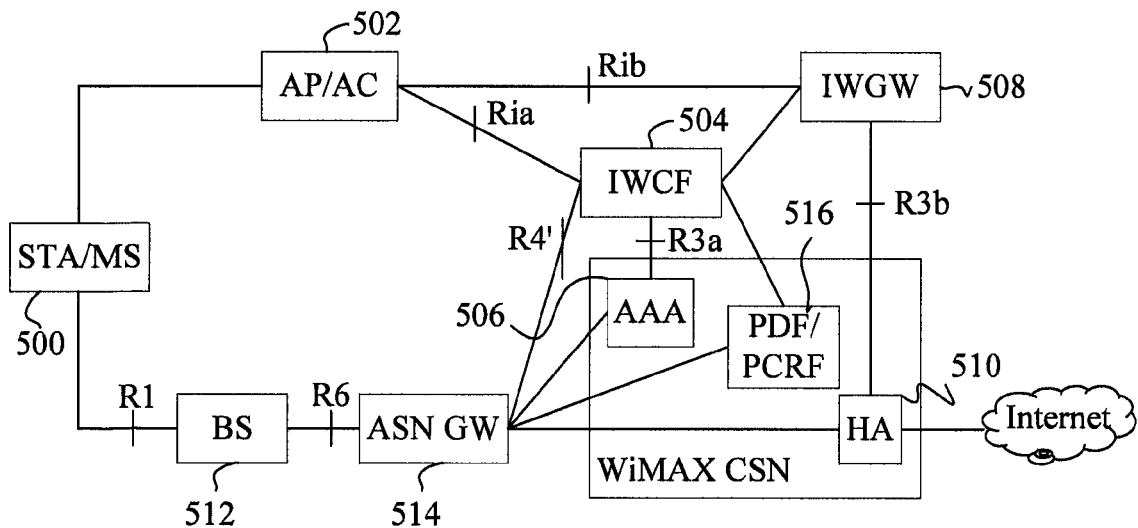
FIG. 5d is an architecture diagram of an expanded system for converging WiMAX and WiFi networks according to an embodiment of the present invention.

Further, the system for converging WiMAX and WiFi networks, where the system is shown in FIG. 5a, FIG. 5b, and FIG. 5c, may also be expanded. If a policy and charging control (PCC) system is deployed in the WiMAX CSN, a policy distribution function (PDF)/policy and charging rules function (PCRF) 516 is also deployed in the WiMAX CSN. At this time, as shown in FIG. 5d, the PDF/PCRF 516 may establish a communication connection with the IWCF 504, so that the AP/AC 502 implements the communication connection with the PDF/PCRF 516 through the R4' interface and the IWCF 504, and the PDF/PCRF 516 transmits a charging policy and/or a quality of service (QoS) policy to the IWCF 504. The PDF/PCRF 516 may also establish a communication connection with the ASN GW 514 according to definition of WiMAX.

It should be added that, the system shown in FIG. 5d is expanded based on the system shown in FIG. 5c. In fact, similar expansion may be made based on the system shown in FIG. 5a or FIG. 5b respectively, that is, to establish a communication connection between the IWCF 504 and the PDF/PCRF 516, so as to implement exchange of the charging policy and/or QoS between the IWCF 504 and the PDF/PCRF 516. The system shown in FIG. 2a, FIG. 2b, or FIG. 2c may also be further expanded respectively, that is, to establish a communication connection between the IWA and the PDF/PCRF, so as to implement exchange of the charging policy and/or QoS between the IWA and the PDF/PCRF.

By using the system for converging WiMAX and WiFi networks disclosed in the foregoing embodiments of the present invention, convergence of one or more functions between the WiFi and WiMAX networks may be implemented conveniently.

Figure 6A:
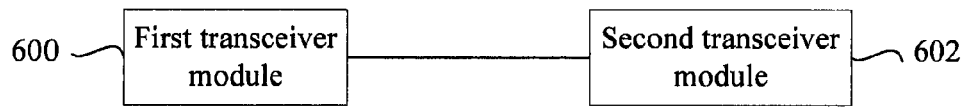
FIG. 6a is a schematic structural diagram of a network convergence apparatus according to an embodiment of the present invention.

An embodiment of the present invention further provides a network convergence apparatus, so as to implement construction of the system in the foregoing system embodiments. As shown in FIG. 6a, the apparatus includes: a first transceiver module 600, configured to receive an access authentication message from an AP/AC of a WiFi network, where the access authentication message carries identity information of a terminal STA/MS; and a second transceiver module 602, configured to forward the access authentication message received by the first transceiver module 600 and the identity information of the STA/MS carried in the access authentication message to an AAA server in a WiMAX network, and receive an access authentication response message from the AAA server, where the first transceiver module 600 is further configured to send the access authentication response message received by the second transceiver module 602 to the AP/AC.

Figure 6B:
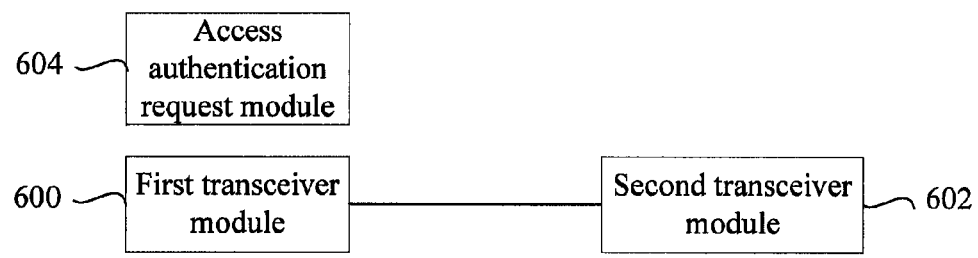
FIG. 6b is a schematic structural diagram of an expanded network convergence apparatus according to an embodiment of the present invention.

Optionally, as shown in FIG. 6b, the apparatus may also include an access authentication request module 604, configured to send an access authentication request message to the AP/AC.

The apparatus may be the IWA in FIG. 2a, FIG. 2b, or FIG. 2c, or the IWCF in FIG. 5a, FIG. 5b, or FIG. 5c, or the IWA shown in FIG. 3 or FIG. 4. If the apparatus is the IWA shown in FIG. 3 or FIG. 4, the communication between the apparatus and the AAA server is relayed through the ASN GW of the WiMAX.

By using the apparatus, convergence between WiFi network access authentication and WiMAX CSN access authentication may be implemented, so that the STA/MS may access the WiMAX CSN through a single authentication.

Figure 6C:
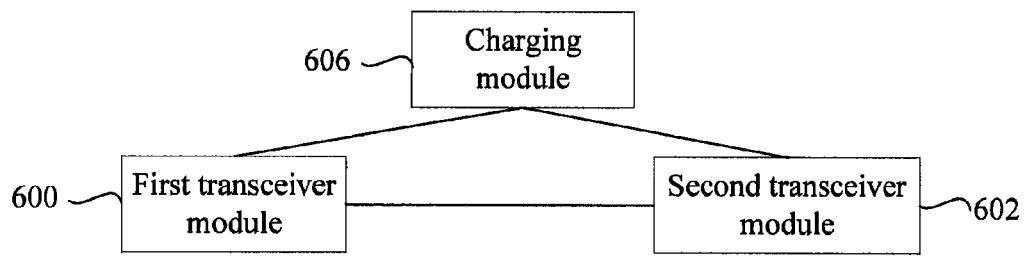
FIG. 6c is a schematic structural diagram of an expanded network convergence apparatus according to an embodiment of the present invention.

Further, optionally, as shown in FIG. 6c, the apparatus may further include a charging module 606, configured to collect accounting information of the STA/MS on the first transceiver module 600, generate an accounting packet according to the accounting information, and send the accounting packet to the AAA server through the second transceiver module 602.

The apparatus including the charging module 606 may be the IWA in FIG. 2a, FIG. 2b, or FIG. 2c, or the IWCF in FIG. 5a, FIG. 5b, or FIG. 5c, or the IWA shown in FIG. 3 or FIG. 4. If the apparatus is the IWA shown in FIG. 3 or FIG. 4, the communication between the apparatus and the AAA server is relayed through the ASN GW of the WiMAX.

Figure 6D:
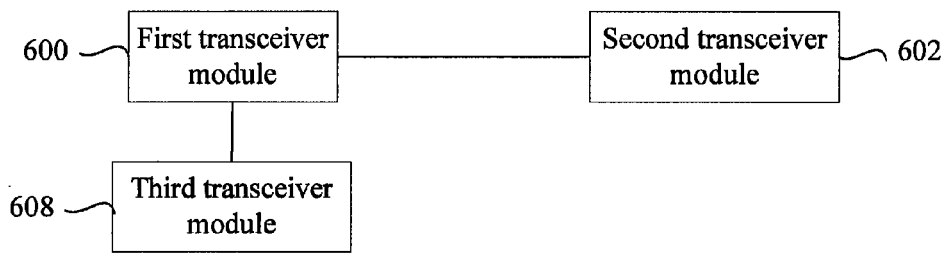
FIG. 6d is a schematic structural diagram of an expanded network convergence apparatus according to an embodiment of the present invention.

Further, optionally, as shown in FIG. 6d, the apparatus may further include a third transceiver module 608, where the third transceiver module 608 is connected to the first transceiver module 600 and configured to, when the STA/MS is handed over between a WiMAX access network and the AP/AC, forward a context of the STA/MS between an ASN GW of the WiMAX access network and the AP/AC.

The apparatus including the third transceiver module 608 may be the IWA in FIG. 2c, or the IWCF in FIG. 5c, or the IWA in FIG. 3.

Figure 6E:
FIG. 6e is a schematic structural diagram of an expanded network convergence apparatus according to an embodiment of the present invention.

Further, optionally, as shown in FIG. 6e, the apparatus may further include an information obtaining module 610, configured to obtain accounting information or QoS information from a PDF/PCRF of the WiMAX network. The apparatus including the information obtaining module 610 may be the IWA in FIG. 2a, FIG. 2b, or FIG. 2c, or the IWCF in FIG. 5a, FIG. 5b, or FIG. 5c.

Figure 6F:
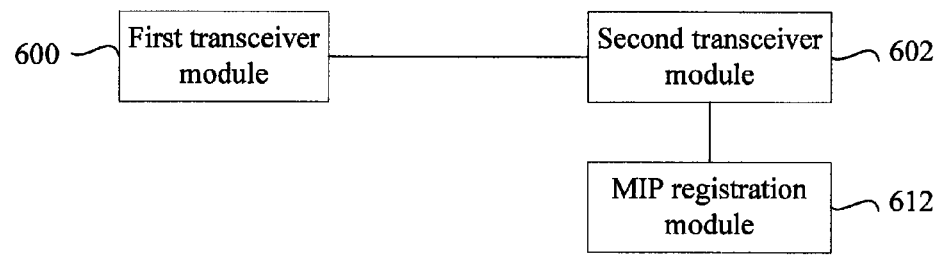
FIG. 6f is a schematic structural diagram of an expanded network convergence apparatus according to an embodiment of the present invention.

Further, optionally, as shown in FIG. 6f, the apparatus may further include a MIP registration module 612, configured to allocate a CoA to the STA/MS, send a MIP registration request to an HA in the WiMAX network through the second transceiver module 602, and register the CoA to the HA. The second transceiver module 602 is further configured to receive a MIP registration response from the HA. The MIP registration module 612 is further configured to judge, according to the MIP registration response received by the second transceiver module 602, whether the MIP registration is successful, and establish a MIP tunnel between the MIP registration module 612 and the HA if the MIP registration is successful.

Figure 6G:
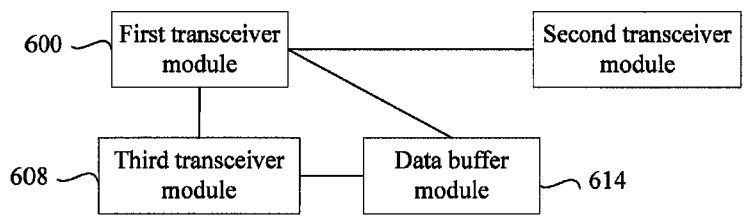
FIG. 6g is a schematic structural diagram of an expanded network convergence apparatus according to an embodiment of the present invention.

Further, optionally, as shown in FIG. 6g, if the apparatus includes the third transceiver module 608, the apparatus may further include a data buffer module 614, where the data buffer module 614 is connected to the first transceiver module 600 and the third transceiver module 608. The data buffer module 614 is configured to, when the STA/MS is handed over between the WiMAX access network and the AP/AC, buffer uplink and/or downlink data of the STA/MS in an original network, and forward the data to a target network of the STA/MS after the handover is successful; the data is received/sent by the first transceiver module 600 between the apparatus and the AP/AC; and the data is received/sent by the third transceiver module 608 between the apparatus and the ASN GW.

The apparatus including the MIP registration module 612 and/or the data buffer module 614 may be the IWA in FIG. 2c, or the IWA in FIG. 3. If the apparatus is the IWA in FIG. 3, the communication between the apparatus and the HA is relayed through the ASN GW of the WiMAX.

Figure 6H:
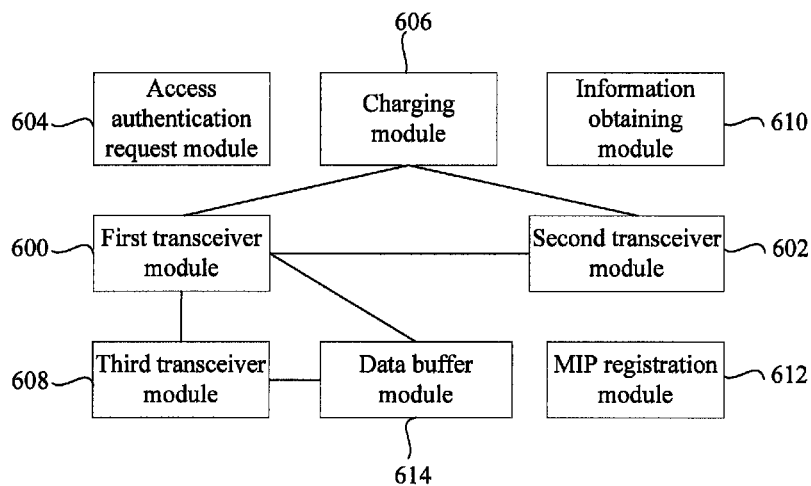
FIG. 6h is a schematic structural diagram of an expanded network convergence apparatus according to an embodiment of the present invention.

The apparatus including all the foregoing optional modules is as shown in FIG. 6h. That is, the apparatus shown in FIG. 6h may be the IWA in FIG. 2c plus the function of connecting the PDF/PCRF, or the IWA in FIG. 3 with a complete function, or the IWCF in the system shown in FIG. 5d.

By using various apparatuses disclosed in this embodiment, convergence of one or more functions between the WiFi and WiMAX networks may be implemented conveniently.

Figure 7:
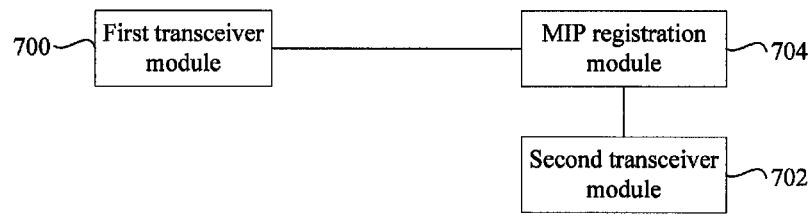
FIG. 7 is a schematic structural diagram of a network convergence apparatus according to an embodiment of the present invention.

An embodiment of the present invention further provides an apparatus. As shown in FIG. 7, the apparatus includes:

a first transceiver module 700, configured to receive a MIP registration indication from an IWCF;

a second transceiver module 702, configured to communicate with an HA in the WiMAX network; and a MIP registration module 704, configured to send a MIP registration request to the HA through the second transceiver module 702 according to the MIP registration indication received by the first transceiver module 700, where the second transceiver module 702 is further configured to receive a MIP registration response from the HA; and the MIP registration module 704 is further configured to establish, according to the MIP registration response received by the second transceiver module 702, a MIP tunnel between the MIP registration module 704 and the HA when the MIP registration is successful.

The apparatus may be the IWGW in FIG. 5b or FIG. 5c.

By using the apparatus disclosed in this embodiment, convergence of the data plane between WiFi and WiMAX CSN may be implemented.

By using the system and the apparatus disclosed in the embodiments of the present invention, convergence of one or more functions such as uniform authentication, MIP registration and MIP tunnel establishment, seamless handover, and common charging between the WiFi and WiMAX networks may be implemented.

Through the preceding description of the embodiments, it is apparent to persons skilled in the art that the present invention may be accomplished by software on a necessary universal hardware platform, and definitely may also be accomplished by hardware, but in most cases, the present invention is preferably implemented through the former method. Based on this understanding, the nature of the technical solutions of the present invention or the part that makes contributions to the prior art may be substantially embodied in the form of a software product. The computer software product may be stored in a readable storage medium, for example, a floppy disk, a hard disk, or an optical disk of the computer, and contain several instructions configured to instruct computer equipment (for example, a personal computer, a server, or network equipment) to perform the method according to the embodiments of the present invention.

Finally, it should be noted that the preceding embodiments are merely provided for describing the technical solutions of the present invention, but not intended to limit the present invention. Although the present invention has been described in detail with reference to the foregoing embodiments, it should be understood by persons of ordinary skill in the art that modifications may still be made to the technical solutions described in the foregoing embodiments, or equivalent replacements may still be made to some technical features in the technical solutions, however, these modifications or replacements do not make the corresponding technical solutions depart from the spirit and scope of the technical solutions in the embodiments of the present invention.

What is claimed is:

1. A system for converging Worldwide Interoperability for Microwave Access (WiMAX) and Wireless Fidelity (WiFi) networks, comprising:

an interworking adaptor (IWA) or interworking control function (IWCF), wherein the IWA or IWCF is configured to communicate with an access point (AP)/access controller (AC) of the WiFi network and also configured to communicate with an entity in a connectivity service network (CSN) of the WiMAX network, and the IWA or IWCF is further configured to perform access control on a terminal STA/MS accessing the CSN from the WiFi network, wherein the entity in the CSN is specifically an authentication, authorization, and accounting (AAA) server;

the IWA or IWCF is configured to receive an access authentication message from the AP/AC, wherein the access authentication message carries identity information of the terminal STA/MS;

the IWA or IWCF is further configured to forward the access authentication message and the identity information of the STA/MS carried in the access authentication message to the AAA server, so that the AAA server performs access authentication on the STA/MS;

the IWA or IWCF is further configured to, before receiving the access authentication message from the AP/AC, send an access authentication request message to the AP/AC, so that the AP/AC forwards the access authentication request message to the STA/MS; and the access authentication message received by the IWA or IWCF from the AP/AC is sent by the STA/MS to the AP/AC.

2. The system according to claim 1, wherein the IWA or IWCF is further capable of communicating with an access service network gateway (ASN GW) of the WiMAX network, and when the STA/MS is handed over between a WiMAX access network and the AP/AC, the IWA or IWCF is further configured to forward a context of the STA/MS between the ASN GW and the AP/AC.

3. The system according to claim 1, wherein if the system comprises the IWA, the IWA is further configured to, when the STA/MS is handed over between a WiMAX access network and the AP/AC, buffer uplink and/or downlink data of the STA/MS in an original network, and forward the data to a target network of the STA/MS after the handover is successful.

4. The system according to claim 1, wherein if the system comprises the IWA, the IWA is further configured to, after access authentication on the STA/MS is successful, send a mobile Internet Protocol (MIP) registration request to a home agent (HA) in the CSN of the WiMAX network; and receive a MIP registration response from the HA, and establish a MIP tunnel between the IWA and the HA after the registration is successful.

5. The system according to claim 4, wherein the IWA is further configured to implement at least one of the following functions: WiFi gateway function, traffic control function, and security control enhancement function.

6. The system according to claim 1, wherein if the system comprises the IWCF, the system further comprises an Interworking Gateway (IWGW), and the IWGW is further capable of communicating with an HA of the WiMAX network and the IWCF; and the IWCF is further configured to forward a MIP registration request to the IWGW after access authentication on the STA/MS is successful; trigger the IWGW to forward the MIP registration request to the HA in the CSN of the WiMAX network; and the IWGW is further configured to receive a MIP registration response from the HA, forward the registration response to the IWCF, and after the MIP registration is successful, establish a MIP tunnel between the IWGW and the HA.

7. The system according to claim 6, wherein the IWGW is further configured to implement at least one of the following functions: WiFi gateway function, traffic control function, and security control enhancement function.

8. The system according to claim 1, wherein the IWA or IWCF is further configured to collect accounting information during the period that the STA/MS accesses the WiMAX network from the AP/AC, generate an accounting packet according to the accounting information, and report the accounting packet to the AAA server.

9. The system according to claim 1, wherein the IWA or IWCF is further configured to communicate with a policy distribution function (PDF)/policy and charging rules function (PCRF) of the WiMAX network, and the IWA or IWCF is further configured to obtain accounting information or quality of service (QoS) information from the PDF/PCRF.

10. A system for converging Worldwide Interoperability for Microwave Access (WiMAX) and Wireless Fidelity (WiFi) networks, comprising:

an interworking adaptor (IWA), wherein the IWA is capable of communicating with an access point (AP)/access controller (AC) of the WiFi network and also capable of communicating with an access service network gateway (ASN GW) of the WiMAX network, and the IWA is configured to perform access control on a terminal STA/MS accessing the ASN GW from the WiFi network, wherein the IWA is configured to receive an access authentication message from the AP/AC, wherein the access authentication message carries identity information of the terminal STA/MS; and forward the access authentication message and the identity information of the STA/MS carried in the access authentication message to the ASN GW; and the ASN GW is configured to forward the access authentication message and the identity information of the STA/MS carried in the access authentication message to an authentication, authorization, and accounting (AAA) server, so that the AAA server performs access authentication on the STA/MS, and the IWA is further configured to receive an access authentication response message from the ASN GW, and forward the access authentication response message to the AP/AC.

11. The system according to claim 10, wherein the IWA is further configured to, before receiving the access authentication message from the AP/AC, send an access authentication request message to the AP/AC, so that the AP/AC forwards the access authentication request message to the STA/MS; and the access authentication message received by the IWA from the AP/AC is sent by the STA/MS to the AP/AC.

12. The system according to claim 10, wherein the IWA is further configured to send a mobile Internet Protocol (MIP) registration request to the ASN GW;

the ASN GW is configured to forward the MIP registration request to a home agent (HA) in a connectivity service network (CSN) of the WiMAX network; and the ASN GW is further configured to receive a MIP registration response from the HA, and forward the registration response to the IWA; and the IWA is further configured to establish a MIP tunnel between the IWA and the HA after the MIP registration is successful.

13. The system according to claim 10, wherein the IWA is further configured to, when the STA/MS is handed over between a WiMAX access network and the AP/AC, forward a context of the STA/MS between the ASN GW and the AP/AC.

14. The system according to claim 10, wherein the IWA is further configured to, during the handover, buffer uplink and/or downlink data of the STA/MS in an original network, and forward the data to a target network of the STA/MS after the handover is successful.

15. The system according to claim 14, wherein the IWA is further configured to implement at least one of the following functions: WiFi gateway function, traffic control function, and security control enhancement function.

16. The system according to claim 10, wherein the AP/AC is further configured to establish a communication connection between the AP/AC and the ASN GW;

the IWA is further configured to trigger the ASN GW to send a MIP registration request to an HA in a CSN of the WiMAX network; and the ASN GW is further configured to receive a MIP registration response from the HA, forward the MIP registration response to the IWA, and after the MIP registration is successful, establish a MIP tunnel between the ASN GW and the HA.

17. The system according to claim 16, wherein the ASN GW is further configured to, in a process that the STA/MS is handed over from a WiMAX access network to the AP/AC, buffer uplink and/or downlink data of the STA/MS in an original network, and forward the data to the AP/AC directly after the handover is successful.

18. The system according to claim 10, wherein the IWA is further configured to collect accounting information during the period that the STA/MS accesses the WiMAX network from the AP/AC, generate an accounting packet according to the accounting information, and forward the accounting packet to the AAA server through the ASN GW.

19. A network convergence apparatus, comprising:

a first transceiver module, configured to receive an access authentication message from an access point (AP)/access controller (AC) of a Wireless Fidelity (WiFi) network, wherein the access authentication message carries identity information of a terminal STA/MS;

a second transceiver module, configured to forward the access authentication message received by the first transceiver module and the identity information of the STA/MS carried in the access authentication message to an authentication, authorization, and accounting (AAA) server in a Worldwide Interoperability for Microwave Access (WiMAX) network, and receive an access authentication response message from the AAA server; and an access authentication request module, configured to send an access authentication request message to the AP/AC, wherein the first transceiver module is further configured to forward the access authentication response message received by the second transceiver module to the AP/AC.

20. The apparatus according to claim 19, further comprising:

a mobile Internet Protocol (MIP) registration module, configured to send a MIP registration request to a home agent (HA) in the WiMAX network through the second transceiver module, wherein the second transceiver module is further configured to receive a MIP registration response from the HA; and the MIP registration module is further configured to establish a MIP tunnel between the MIP registration module and the HA when the MIP registration is successful.

21. The apparatus according to claim 19, further comprising a third transceiver module, wherein the third transceiver module is connected to the first transceiver module and configured to, when the STA/MS is handed over between a WiMAX access network and the AP/AC, forward a context of the STA/MS between an access service network gateway (ASN GW) of the WiMAX network and the AP/AC.

22. The apparatus according to claim 21, further comprising a data buffer module, wherein the data buffer module is connected to the first transceiver module and the third transceiver module, wherein the data buffer module is configured to, when the STA/MS is handed over between the WiMAX access network and the AP/AC, buffer uplink and/or downlink data of the STA/MS in an original network, and forward the data to a target network of the STA/MS after the handover is successful;

the data is received/sent by the first transceiver module between the apparatus and the AP/AC; and the data is received/sent by the third transceiver module between the apparatus and the ASN GW.

23. The apparatus according to claim 19, further comprising:

a charging module, configured to collect accounting information of the STA/MS on the first transceiver module, generate an accounting packet according to the accounting information, and send the accounting packet to the AAA server through the second transceiver module.

24. The apparatus according to claim 19, further comprising:

an information obtaining module, configured to obtain accounting information or quality of service (QoS) information from a policy distribution function (PDF)/policy and charging rules function (PCRF) of the WiMAX network.

25. A network convergence apparatus, comprising:

a first transceiver module, configured to receive an access authentication message from an access point (AP)/access controller (AC) of a Wireless Fidelity (WiFi) network, wherein the access authentication message carries identity information of a terminal STA/MS;

a second transceiver module, configured to forward the access authentication message received by the first transceiver module and the identity information of the STA/MS carried in the access authentication message to an authentication, authorization, and accounting (AAA) server in a Worldwide Interoperability for Microwave Access (WiMAX) network, and receive an access authentication response message from the AAA server;

an access authentication request module, configured to send an access authentication request message to the AP/AC, the first transceiver module is further configured to forward the access authentication response message received by the second transceiver module to the AP/AC; and a MIP registration module, configured to forward an MIP registration request to a home agent (HA) in the WiMax network through the second transceiver module according to a MIP registration request received by the first transceiver module, wherein the second transceiver module is further configured to receive a MIP registration response from the HA; and the MIP registration module is further configured to establish, according to the MIP registration response received by the second transceiver module, a MIP tunnel between the MIP registration module and the HA when the MIP registration is successful.

\* \* \* \* \*